United States Patent Office 3,376,429
Patented Apr. 2, 1968

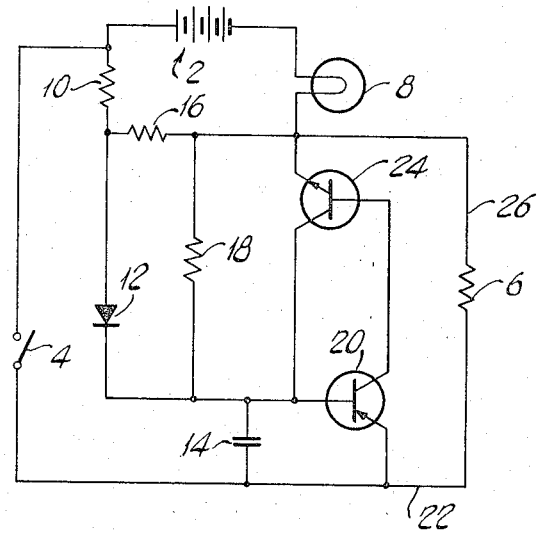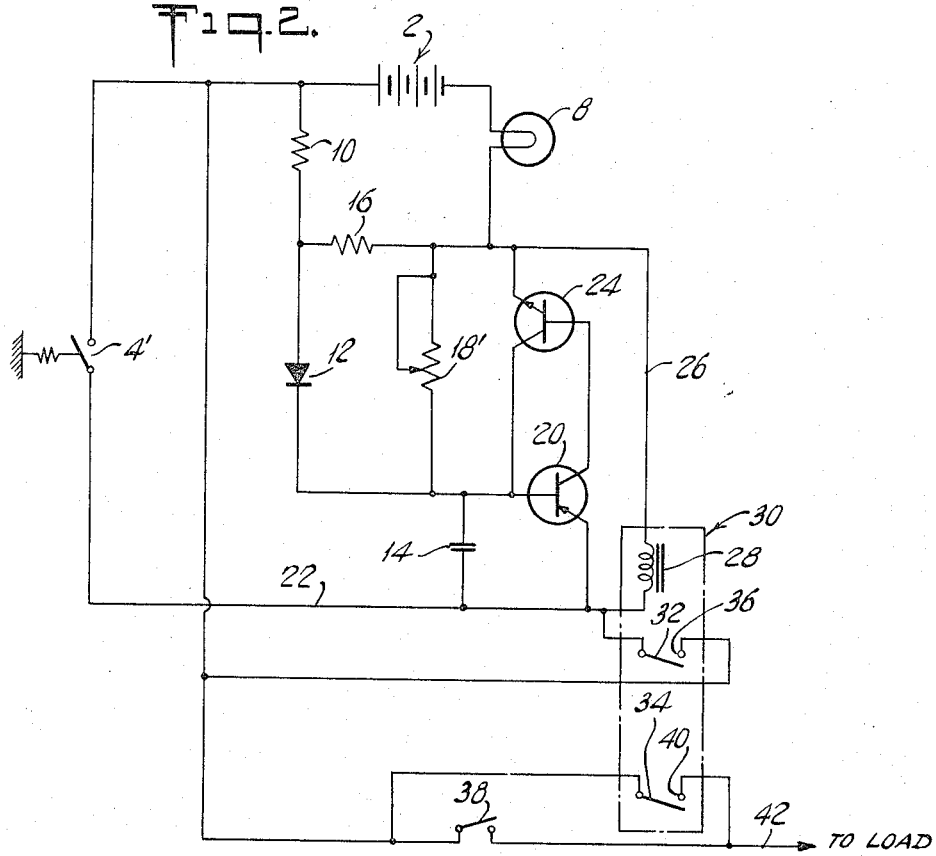

3,376,429
TIME DELAY CIRCUIT
Carl E. Atkins, Montclair, and Robert L. Ziolkowski, South Plainfield, N.J., assignors, by mesne assignments, to Wagner Electric Corporation, South Bend, Ind., a corporation of Delaware
Filed June 4, 1965, Ser. No. 461,241
7 Claims. (Cl. 307—141)

The present invention comprises a versatile time delay circuit that requires few and simple parts and that permits ready adjustment of the period of delay. The new circuit may be used to delay energization of a signal or the like for a predetermined time or to provide for instant operation of a device followed by restoration to initial condition after a desired period of delay. For example, the circuit may be used to display a signal only after a condition has been maintained for a predetermined length of time, being insensitive to transient changes in the condition or it may be used to energize a device for a predetermined time only.

More specifically, if it is desired to signal the driver of an automobile that he is "riding" the brake switch, the circuit can be arranged to light a signal lamp only after the brake switch has been maintained closed for more than, say, one minute. On the other hand, the circuit may be arranged to respond rapidly and then, after a predetermined time delay, restore conditions to normal. More specifically, the circuit may be arranged to turn on automobile head lamps and maintain the lamps on for a predetermined period and then automatically turn them off or the circuit may be arranged to open the audio circuit of a television set and maintain it open for a predetermined length of time, usually that of a commercial, and then re-close the audio circuit. Various other applications of the new circuit will be apparent to those skilled in the art.

Briefly, the circuit comprises a capacitor which is charged from a direct current source of potential and which, when a switch is closed, discharges slowly at a predetermined but adjustable rate. When the capacitor becomes sufficiently discharged, a regenerative circuit is energized and a signal lamp is lighted to indicate that the switch has been maintained closed for the period of discharge of the capacitor. When the new circuit is to be employed for control of other circuits, a relay is included which is energized upon closure of the switch and which over one of its armatures closes a holding circuit for the relay. When the capacitor discharges sufficiently, the regenerative circuit becomes energized and shunts the relay to release its armatures. Any number or variety of independent circuits may be controlled over the armatures of the relay as, for example, a circuit by-passing the usual light switch in an automobile. The regenerative circuit in the specific embodiment illustrated in the drawing employs transistors coupled in a regenerative loop. For a better understanding of the invention and of a preferred embodiment thereof, reference may be had to the accompanying drawing of which:

FIG. 1 is a simple circuit in which a signal lamp is energized only after a switch has been maintained closed for a predetermined length of time but which will continue to be energized thereafter so long as the switch is closed, and FIG. 2 is a circuit generally similar to that of FIG. 1 but including a relay for control of additional circuits.

In FIG. 1, a source of direct current energy is indicated at 2 with its positive terminal connected to one terminal of a normally open switch 4. The other terminal of switch 4 is connected through a resistor 6 and a signal lamp or other indicating device 8 to the negative terminal of the battery 2. A resistor 10 and diode 12 are connected in series with a capacitor 14 across the switch 4, and a resistor 16 is connected in series with the resistor 10 and lamp 8 across the battery 2. A high resistor 18 is connected between the lamp 8 and one side of capacitor 14 to provide a discharge path for the capacitor. A PNP transistor 20 which may be a 2N3638 has its emitter connected to the line 22 connecting switch 4 with resistor 6, its base connected to the junction of resistor 18 and capacitor 14 and to the collector of an NPN transistor 24 which may be a 2N2926. The collector of transistor 20 is connected to the base of transistor 24. The emitter of transistor 24 is connected to the lamp 8.

Operation of the above described circuit is as follows:
With the switch 4 open, capacitor 14 will be charged, the charging circuit being through resistor 10 and diode 12 to one side of the capacitor, the other side of which will be at the potential of the junction of lamp 8 with the lead 26 connecting resistor 6 to the lamp. A trickle current will flow through resistors 10 and 16 and the lamp 8, which current will be insufficient to cause the light to be illuminated but will be sufficient to drop the potential at the anode of the diode 12 to a value below that of the positive terminal of the source 2. No current will flow through resistor 6 and as the potential at the base of transistor 20 will be positive with respect to its emitter, the transistor will be non-conducting. Transistor 24 will likewise be non-conducting because of the absence of base current. If switch 4 is now closed, current flows from the battery 2 through resistor 6 and the lamp. This current will still be insufficient to light the lamp. However, the closure of switch 4 applies the potential of the positive terminal of the battery 2 to the lower electrode of capacitor 14 causing the capacitor to start to discharge through the higher resistor 18. When the capacitor discharges sufficiently to reduce the potential at the base of transistor 20 to a valve below that of the emitter, transistor 20 will start to conduct which, in turn, initiates conduction of transistor 24. Conduction of transistor 24 further reduces the potential at the base of transistor 20 causing higher conduction through transistor 20 and regeneration thus occurs with maximum current through both transistors. The low resistance path thus provided between line 22 and the lamp 8 shunts resistor 6 and causes the lamp to become fully illuminated. This condition will continue so long as switch 4 is closed. When switch 4 is opened, the capacitor 14 quickly charges through diode 12 to turn off the transistor circuit and restore the circuit to its initial condition. The time of delay between closure of the switch 4 and full illumination of the lamp 8 will depend upon the rate of discharge of capacitor 14 and this, in turn, depends upon the magnitude of resistor 18. For a one minute delay, for example, resistor 18 may be 10 megohms. Resistors 10 and 16 should be sufficiently high to prevent illumination of the lamp 8 when switch 4 is open and also the magnitude of resistor 6 should be high enough to prevent illumination of the lamp 8 when the switch 4 is closed and the transistor loop is not conducting. The rate of charge of capacitor 14 will depend upon the magnitude of resistor 10. As an example, if resistor 10 is 3.3 kilohms, capacitor 14 will charge in milliseconds. By adding additional resistance in series with the diode 12, a longer period of charge can be obtained if desired.

Switch 4 has been illustrated as a manually operable switch but obviously the switch may be one operated in response to a condition as, for example, temperature or humidity or the like, and therefore it is intended merely as symbolic of any circuit closing device, the closure of which is to be detected only after a predetermined delay. It will be apparent that if switch 4 is re-opened before capacitor 14 has discharged sufficiently to render transistors 20 and 22 conductive, the signal lamp 8 will not be energized.

The circuit of FIG. 2, while similar in most respects to that of FIG. 1, differs therefrom primarily in the substitution of the winding 28 of a relay 30 for the resistor 6 of FIG. 1 and in the connections to its armatures 32 and 34. Armature 32 is connected to line 22 and the normally open contact 36 associated therewith is connected to the positive terminal of battery 2. Switch 4', corresponding to switch 4 of FIG. 1 which is represented in FIG. 2 as a push button switch, is thus bridged by armature 32 when the relay is energized. In the particular embodiment of the invention illustrated in FIG. 2, armature 34 is connected to one side of a manually operable switch 38 and the normally open contact 40 associated with armature 34 is connected to the other side of switch 38. Switch 38 may be, for example, an automobile head lamp switch, in which case it would be in the circuit between the battery and a lamp load connected to the lead 42. The operation of the circuit is like that already described except for the difference occasioned by the circuit including armature 32, as will be apparent from the following.

When switch 4' is momentarily closed, relay 28 is promptly energized to reverse all of its armatures. Armature 32 closes the by-pass about switch 4' permitting that switch to open without de-energizing the relay. Capacitor 14 which was previously charged through resistor 10 and diode 12 thereupon starts to discharge through the high resistor 18'. After the time delay, say, one minute, the discharge of capacitor 14 is sufficient to cause condition of the transistors 20 and 24 which when conducting shunt the relay winding 28 and cause release of its armatures. Lamp 8 also becomes illuminated because of the removal of winding 28 from its circuit. Armature 32 moves away from contact 36 when the relay releases restoring the circuit to its initial condition. By making resistor 18' adjustable, the delay period may be readily adjusted to that desired for any particular application.

If when the switch 4' is closed, switch 38 is opened manually, the lamp circuit will be maintained closed over armature 34 during the period that relay 30 is energized, thus delaying extinguishment of the lamps.

Obviously, the circuit of FIG. 2, by different connections to armature 34 and its associated contacts, could be employed for other than control of a lamp load. Instead of closing a circuit for a predetermined time, as in the illustrated arrangement, a normally closed circuit could be opened for such period of time, or a circuit element could be shunted for a period of time.

The invention has now been described and various possible uses thereof have been suggested. Although in each of the figures the same elements have been shown, obviously variations in the specific elements could be made without departing from the spirit of the invention. For example, the regenerative loop has been shown as comprising a PNP and NPN transistor. These two transistors could be replaced by a four-zone device such as 2N1966 in which case resistors 10 and 16 could be omitted. Various other changes in the specific elements and various other uses for the new circuit will be apparent to those skilled in the art. The invention in its broadest aspect is not limited to the preferred embodiments illustrated but only by the scope of the accompanying claims.

We claim:

1. A time delay circuit comprising in combination a direct current source of energy, charge storing means, a path for charging said means from said source, said path including a unidirectional current element oriented for rapid charging of said storage means, a circuit including a normally open switch, an impedance and a signal device connected in series across said source, a high resistor connected between said signal device and said storage means for providing a slow discharge path for said storage means upon closure of said switch, and a regenerative loop connected across said impedance and maintained non-conductive when said storage means is charged, said loop becoming conductive to shunt said impedance and actuate said signal device when the charge of said storage device reduces to a predetermined value following closure of said switch.

2. The time delay circuit according to claim 1 wherein said impedance is the winding of a relay and wherein a push button switch is connected in parallel with said first mentioned switch, said first mentioned switch being coupled to an armature of said relay for closure when the relay is energized and for opening when the relay winding is shunted by said regenerative loop.

3. The time delay circuit according to claim 1 wherein said regenerative loop includes a semiconductor device having emitter, base, and collector terminals, said storage means being connected to said base terminal for control of conduction of said semiconductor device in accordance with the charge on said storage device.

4. The time delay circuit according to claim 1 wherein said regenerative loop comprises a PNP transistor and an NPN transistor each having emitter, base and collector terminals, the emitter terminal of said PNP transistor being connected to the junction of said switch and said impedance, the base terminal of said PNP transistor being connected to the junction of said storage device and said high resistor and to the collector terminal of said NPN transistor, the collector terminal of said PNP transistor being connected to the base terminal of said NPN transistor and the emitter terminal of said NPN transistor being connected to the junction of said impedance and signal device.

5. A time delay circuit comprising in combination a direct current source of energy, a unidirectional current element, a capacitor, an impedance and a signal device connected in series across said source for charging said capacitor, a high resistor connected between the junction of said signal device with said impedance and the junction of said unidirectional element and capacitor for providing a path for slow discharge of said capacitor, a semiconductor regenerative circuit connected in parallel with said impedance and having a control electrode connected to the junction of said high resistor and capacitor for preventing conduction by said semiconductor circuit when the charge in said capacitor is above a predetermined value, and switch means for shunting said unidirectional element and capacitor to initiate discharge of said capacitor and eventual shunting of said impedance by said regenerative circuit.

6. The time delay circuit according to claim 5 wherein said impedance is the winding of a relay, said switch means comprising two switches connected in parallel, one of said switches being biased to open position to be momentarily manually closed and the other of said switches comprising an armature associated with said relay for closure when the relay winding is energized.

7. The time delay relay according to claim 6 wherein said relay includes a second armature and wherein an independent circuit is controlled over said second armature for the duration of energization of said relay winding.

References Cited

UNITED STATES PATENTS

| 3,069,552 | 12/1962 | Thomson | 307—88.5 X |
| 3,210,613 | 10/1965 | Prapis | 307—88.5 X |
| 3,246,209 | 4/1966 | Multari et al. | 307—88.5 X |
| 3,282,631 | 11/1966 | Mosinski | 328—129 X |

ORIS L. RADER, *Primary Examiner.*

T. B. JOIKE, *Assistant Examiner.*